United States Patent [19]

Langan et al.

[11] 4,015,055

[45] Mar. 29, 1977

[54] METAL OXIDE CELLS HAVING LOW INTERNAL IMPEDANCE

[75] Inventors: Richard Allen Langan, Parma; Nicholas Joseph Smilanich, Rocky River; Akiya Kozawa, Middleburg Heights, all of Ohio

[73] Assignee: Union Carbide Corporation, New York, N.Y.

[22] Filed: Sept. 29, 1975

[21] Appl. No.: 617,636

[52] U.S. Cl. .............................. 429/145; 429/237
[51] Int. Cl.² ...................................... H01M 6/06
[58] Field of Search .......... 136/107, 106, 102, 137, 136/138, 20, 23, 24, 146; 429/144, 145, 162, 164, 206, 207, 209, 219, 220, 222, 237, 241, 245, 224, 218

[56] References Cited

UNITED STATES PATENTS

| | | | |
|---|---|---|---|
| 2,654,795 | 10/1953 | Brill et al. | 136/120 |
| 3,457,117 | 7/1969 | Angelovich | 136/107 X |
| 3,476,610 | 11/1969 | Krebs et al. | 136/107 |
| 3,485,672 | 12/1969 | Ruben | 136/24 |
| 3,853,623 | 12/1974 | Davis | 136/20 |
| 3,907,598 | 9/1975 | Megahed | 136/107 |

Primary Examiner—John H. Mack
Assistant Examiner—C. F. Lefevour
Attorney, Agent, or Firm—Cornelius F. O'Brien

[57] ABSTRACT

A metal oxide alkaline cell, such as a silver oxide-zinc cell, having a negative electrode, an alkaline electrolyte, a positive electrode comprising for example divalent silver oxide housed in a positve terminal container, a separator disposed between the negative electrode and the positive electrode, and wherein a thin porous, electronically conductive layer, such as a gold layer, is disposed between the positive electrode and the separator and is extended to contact the positive terminal container.

13 Claims, 5 Drawing Figures

METAL OXIDE CELLS HAVING LOW INTERNAL IMPEDANCE

FIELD OF THE INVENTION

This invention relates to a metal oxide alkaline cell and particularly to a silver oxide-zinc cell in which a thin, porous, electronically conductive layer is disposed between the positive electrode and the separator of the cell and extended to contact the positive terminal of the cell so as to reduce the internal impedance of the cell during initial discharge.

BACKGROUND OF THE INVENTION

Miniature button alkaline silver oxide-zinc cells have gained wide acceptance in the battery industry for many applications because they have a high energy density per unit volume. However, one of the major disadvantages of divalent silver oxide-zinc cells is that they discharge at two different potentials. Silver oxide-zinc cells using monovalent silver oxide as the only active cathode material will have a theoretical unipotential discharge at about 1.57 volts but the capacity in milliampere hours per gram of monovalent silver oxide is substantially lower than the capacity of divalent silver oxide. On the other hand, silver oxide-zinc button cells using divalent silver oxide as the only active starting cathode material will discharge at a first potential at about 1.7 volts across a 300-ohm resistor for 40 hours, for example, and then drop to approximately 1.5 volts for an additional period of time of about 70 hours. Thus monovalent silver oxide cells have the advantage of discharging at a unipotential plateau with the disadvantage of having a rather low capacity while divalent silver oxide cells have the advantage of having a rather high capacity but the disadvantage of discharging at two distinct voltage plateaus. Divalent silver oxide has about 1.9 times more capacity per gram than monovalent silver oxide and about 2 times more capacity per unit volume than monovalent silver oxide.

Many cells or battery applications, particularly transistorized devices such as hearing aids, watches and the like, require a substantially unipotential discharge source for proper operation and, therefore, cannot use the dual voltage level discharge which is characteristic of divalent silver oxide cells.

Consequently, many methods have been proposed for obtaining a unipotential discharge from a divalent silver oxide cell. One method disclosed in U.S. Pat. Nos. 3,615,858, and 3,655,450, entails providing a continuous layer of monovalent silver oxide in physical and electrical contact with a divalent silver oxide pellet. During assembly of the cell the cathode pellet is disposed against the inner surface of a cathode cup or collector whereupon the layer of monovalent silver oxide physically isolates the divalent silver oxide from contact with the cathode cup so that the sole electronic path for discharge of the divalent silver oxide is through the monovalent silver oxide layer.

United States patent applications Ser. No. 482,996 now U.S. Pat. No. 3,920,478 and Ser. No. 483,014 now U.S. Pat. No. 3,925,102 both of which were filed on June 25, 1974 in the name of A. Kozawa, disclose another approach to producing divalent slver oxide-zinc cells having a substantially unipotential discharge level even on low drain conditions. The cells use a positive electrode comprising divalent silver oxide housed in a positive electrode container having an upstanding wall and a closed end. Interposed between the positive electrode and the upstanding wall or bottom end of the cathode container is an oxidizable metal screen or ring, such as zinc, which functions to discharge the portion of the positive electrode contacting the container so as to produce a unipotential discharge on low drain conditions.

Although, it is thereby possible to produce a unipotential discharge using divalent silver oxide as an active material of a cell, a problem generally encountered is that during the initial discharge period an undesirably high internal resistance of the cell is manifested by a subnormal cell voltage which gradually increases with time to the expected unipotential voltage level. These voltage variations during the initial discharge of silver oxide-zinc cells, and other metal oxide cells whose cathodic discharge product is electronically conductive, are undesirable for many battery powered devices. A specific example would be battery powered watch applications where the accuracy of the watch movements can be impaired or the performance adversely affected by such voltage variations during intial discharge of the cell. Some proposals for overcoming this drawback in metal oxide miniature type cells would be to apply a conductive coating of a metal on the entire outer surface of the active cathode material of the cell as disclosed in U.S. Pat. No. 2,654,795. This reference also discloses that the conductive material used can vary from about 5% by weight of the active material and in the case where gold is employed as the conductive material, then an amount as little as fractions of 1% can be used.

U.S. Pat. No. 3,853,623 discloses divalent silver oxide cells wherein gold ions are added to the alkaline electrolyte of the cell in an amount of about 0.1 to about 10% by weight of the silver forming the active cathode material. The gold irons are added only on the cathode side of the separator and are employed to provide greater stability of the divalent silver oxide in the alkaline electrolyte of the cell and thus reduce gassing ($O_2$). This patent also discloses that a gold compound can be added directly in the divalent silver oxide cathode, in combination with its addition to the electrolyte with the overall amount of gold in both locations falling within the range specified above.

Accordingly, it is an object of this invention to provide a metal oxide cell which has a thin layer of an electronically conductive material disposed between the separator and the positive electrode of the cell which is extended to contact the positive terminal of the cell so as to eliminate voltage variation during initial discharge of the cell.

Another object of this invention is to provide a miniature button silver oxide-zinc cell employing a thin layer of electronically conductive material at the interface of the separator and the positive electrode of the cell and wherein said conductive layer extends to contact the positive terminal of the cell.

Another object of this invention is to provide a thin electronically conductive layer on at least a portion of the surface of the active cathode material of a metal oxide cell such that said layer is in contact with the separator of the cell and is extended to contact the positive terminal of the cell.

Another object of this invention is to provide a thin electronically conductive layer on at least a portion of the surface of a separator of a metal oxide cell such that said conductive layer contacts the active material of the cell and is extended to contact the positive terminal of the cell.

SUMMARY OF THE INVENTION

The invention relates to a metal oxide alkaline cell comprising a negative electrode, a positive electrode housed in an electronically conductive container having a bottom and a side wall, a separator disposed between said negative electrode (anode) and said positive electrode (cathode), and an electrolyte, said positive electrode comprising a metal oxide wherein the improvement comprises a layer of electronically conductive material disposed solely at the interface of the separator and the positive electrode and extending just sufficiently to contact the wall of the electronically conductive container, the material of said conductive layer selected from the group consisting of gold, platinum, rhodium, palladium, lead, tungsten, tantalum, nickel, iron disulfide and lead oxide. Specifically, the conductive material in the layer should be present in an amount from about 130 micrograms per square inch to about 3000 micrograms per square inch based on the surface area of the positive electrode facing the separator.

As used herein, a conductive layer shall mean a layer disposed on at least a portion of the separator and/or cathode; a discrete film or mesh placed at the cathode-separator-cathode collector interfaces; or a layer disposed on a substrate which in turn is disposed between the separator and the cathode. If the conductive layer covers the entire interface of the cathode and separator, then the layer would have to be porous.

The active cathode material forming the positive electrode of this invention can be selected from the group consisting of silver oxide, mercury oxide, copper oxide and cadmium oxide or mixtures of these materials with other metal oxides such as manganese dioxide and vanadium pentoxide. Preferably the active cathode material can be silver oxide which can comprise 100% divalent silver oxide, 100% monovalent silver oxide or a mixture of divalent silver oxide and monovalent silver oxide as for example 50% to 80% divalent silver oxide remainder monovalent silver oxide. When using mixtures of the silver oxides, preferably at least 50% by weight of the mixture should be divalent silver oxide because of its high discharge capacity. The metal oxide electrode can be formed in a number of ways, for example, finely divided metal oxide powder, such as divalent silver oxide powder mixed with or without monovalent silver oxide, can be pelletized into a desired size pellet using a conventional die. Regardless of how the electrode is made, it has to be sufficiently porous to permit the electrolyte of the cell to diffuse through the electrode. However, the pellet also has to be sufficiently dense so that it can occupy a relatively small space when used in miniature type cell housings if it is to provide the required capacity of such cells.

The active cathode materials for use in this invention, particularly the mixtures of AgO and $Ag_2O$, have very low conductivity until a substantial amount of the final discharge product, in this case metallic silver, has been produced. Thus during initial discharge of a metal oxide cell, there is an undesirably high internal cell resistance which causes the cell output voltage to be initially low followed by a gradual voltage increase with time until the expected discharge voltage level is reached.

To substantially eliminate the voltage variations of metal oxide cells during the silver discharge period, a thin layer of an electronically conductive material, such as gold, is disposed at the interface of the separator and the active cathode electrode and is extended to contact the positive terminal (cathode collector) of the cell. Thus since the initial cathode reaction will proceed from the cathode-separator-anode interface back through the body of the cathode to the cathode collector terminal, the conductive layer will greatly decrease the internal resistance at the separator-cathode-cathode collector interfaces so as to result in effectively eliminating the voltage variations usually associated with the initial discharge of metal oxide cells such as slver oxide-zinc cells. Thus by disposing the conductive layer only at the interface of the cathode and separator, we can effectively localize the initial discharge reaction to this area, thereby effectively utilizing the minimum ionic path length so as to result in lowering the internal resistance of the cell. This lower internal cell resistance is primarily beneficial during the initial discharge period and has the effect that the cell will discharge immediately at the intended voltage level.

It is not necessary for the conductive layer to cover the entire cathode-separator interface or the entire wall area of the container. All that is necessary is that sufficient electronically conductive material be present to make electronic contact between the surface of the cathode adjacent the separator and the wall of the cell container. Thus the conductive layer should be disposed on a portion of the area of the cathode surface facing the separator and extend over the peripheral side wall of the cathode so as to contact the wall of the cathode container.

Since the conductive layer can be confined to the area specified above, the total weight of the conductive material to be employed to substantially decrease the internal resistance of the cell during initial discharge can vary between about 130 micrograms per square inch to about 3000 micrograms per square inch preferably between about 500 micrograms per square inch and about 2000 micrograms per square inch and more preferably about 1800 micrograms per square inch, based on the surface area of the cathode facing the separator.

A conductive material concentration below about 130 micrograms per square inch would be insufficient to provide a good continuous electronic contact to effectively lower the cell's internal resistance during initial discharge while a concentration above 3000 micrograms per square inch would be both wasteful and probably would not be sufficiently porous thereby possibly inhibiting the ionic flow between the anode and the active cathode material. As stated above, if the conductive layer completely covers the surface of the cathode facing the separator, then it is essential that the layer be sufficiently porous so as not to effectively interfere with the ionic flow between the anode and the cathode.

The conductive layer can be disposed at the interface of the cathode and separator using known methods. For example, a thin coating of the conductive materi.. l may be vacuum-deposited prior to cell assembly onto at least a portion of the area of the top surface of the cathode or onto the corresponding surface of the separator such that it will contact the wall of the cathode container. Deposition from the vapor state using electrostatic techniques can also be used, particularly if greater control over the exact location of the conductive material is needed or desired. Alternatively, a disk of material carrying a thin conductive layer may be placed in the cell between the cathode and separator with the conductive layer contacting both cathode and cathode container. The disk could suitably be made of a material which may ultimately dissolve or swell in the cell electrolyte and if it dissolves, it should be a material that would not increase the cell resistance. Placement of the conductive layer onto the cathode or separator surface prior to cell assembly might also be done from a suspension of a conductive material in a suitable liquid medium. Of the above, the vacuum deposition method is preferred because of the coating uniformity achieved even with very thin layers. Of the above-mentioned conductive materials, gold would be preferred because it is a good electronic conductor and can be deposited on a substrate in a very thin layer. Regardless of what material is selected for the conductive layer it must be a good electronic conductor, be oxidation-resistant in the cell environment or at least remain electrically conductive if oxidized, have low solubility in the cell electrolyte and have no adverse effect on the stability of the active cathode material.

In addition to the use of a conductive layer at the cathode-separator-cathode collector interfaces, the abnormally high cell internal resistance during initial discharge can be also reduced by substantially filling all the voids in the cathode with the electrolyte of the cell. This latter feature also helps to provide a higher, more stable voltage level throughout discharge. Thus the combination of employing a thin electronically conductive layer interposed at the interface of the cathode and separator and extending to contact the cathode collector and the addition of extra electrolyte to insure that the voids in the cathode are effectively filled will produce a cell having a discharge voltage substantially level throughout discharge and particularly during the initial discharge period of the cell.

BRIEF DESCRIPTION OF THE DRAWINGS

Referring to FIG. 1, there is shown a sectional elevation of a metal oxide cell having a negative electrode 2, separator 3, and positive electrode 4 housed within a two-part container comprising a cathode container 5 and anode cup 6. As shown, cathode container 5 has a flange 7 which is crimped inwardly against a U-shaped flange 11 on anode cup 6 via grommet 8 during assembly to seal the cell as disclosed, for example, in U.S. Pat. No. 3,069,489. The cathode container may be of nickel-plated steel, nickel, nickel alloys, stainless steel, or the like, while the anode cup 6 may be made of tin-plated steel, copper-clad stainless steel, gold-plated copper-clad stainless steel, or the like. The grommet 8 may be made of a suitable resilient electrolyte-resistant material such as neoprene, nylon, or the like.

Figure 1:
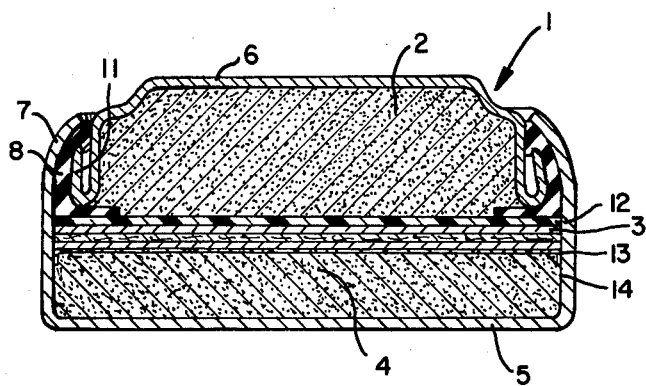
FIG. 1 is a cross-sectional view of a miniature button size metal oxide cell having a electronically conductive layer at the interface of the separator and cathode and extending along the side wall of the cathode thereby contacting the cathode collector or container.
Figure 1A:
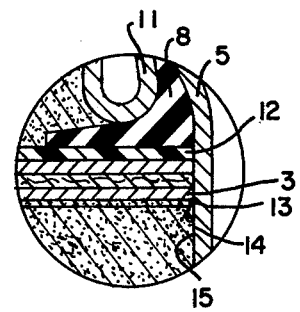
FIG. 1A is an enlarged view of a section of FIG. 1 showing the location of the conductive layer in greater detail.

The separator 3 may be a three-layer laminate consisting of two outer layers of radiation-grafted polyethylene and an inner cellophane layer or the like. Disposed between anode 2 and separator 3 is a layer of electrolyte-absorbent material 12 which may consist of various cellulosic fibers.

The anode (negative) electrode can comprise a lightly compressed pellet 2 of finely divided amalgamated zinc containing, if desired, a gelling agent. Cadmium may also be used as the anode material. The cathode (positive) electrode can comprise a rather densely compressed pellet 4 of a metal oxide powder such as divalent silver oxide powder which could comprise a mixture of divalent silver oxide powder and monovalent silver oxide powder.

The cell electrolyte may be an aqueous solution of potassium hydroxide, sodium hydroxide, or mixtures thereof.

Figure 2:
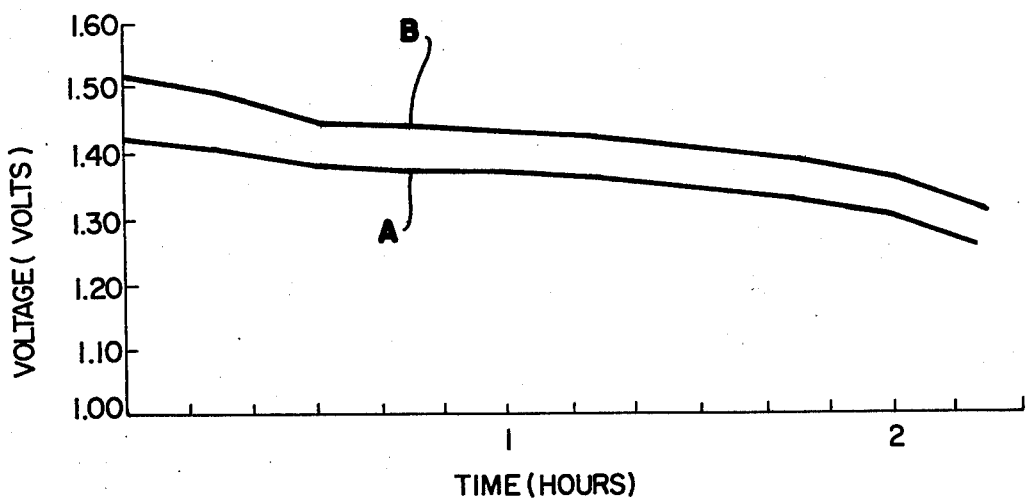
FIG. 2 shows curves of the discharge voltages of a silver oxide-zinc cell employing an electronically conductive layer in accordance with the teachings of this invention.

As shown in FIGS. 1 and 2, a porous electronically conductive layer 13 is disposed at the interface of the separator 3 and cathode 4 and extends partially downward over the side wall 14 of cathode 4 thereby contacting the inner upstanding wall 15 of container 5. The positioning of the conductive layer as shown in FIGS. 1 and 2 as being at the interface of cathode 4 and separator 3 and extending along the side wall 14 in contact with upstanding wall 15 of container 5 will effectively reduce the internal cell resistance during initial discharge of the cell. Although not shown, the conductive layer could have been disposed on the surface of the separator facing the cathode and extended onto the side wall of the separator where it would contact the upstanding wall of the container.

It is also within the scope of this invention to connect two or more such cells in series or parallel by conventional means and then place them in a housing to produce a battery which can be used in various battery-operated devices.

EXAMPLE 1

Two miniature button cells of the general type shown in FIG. 1 were made except that a zinc screen was interposed between the cathode and the inner bottom surface of cathode container as disclosed in U.S. application Ser. No. 482,996. The cells, having a diameter of 0.450 inch (1.14 cm.) and an overall height approximately 0.160 inch (0.40 cm.), were produced using a gelled zinc powder anode, a pellet of active cathode material of 50/50 by weight AgO/Ag$_2$O molded at about a 2-ton pressure and a three-layer separator consisting of two outer layers of cellophane and an inner layer of radiation grafted polyethylene. An additional electrolyte-absorbent separator composed of two layers of a rayon material was employed adjacent to the anode. These components, along with a 33% KOH electrolyte (7.7 M KOH) which was employed in an excessive amount so as to effectively fill the voids of the cathode material, were assembled in a nickel-plated cathode container and a gold-plated copper-clad stainless steel anode cup and then the cell was sealed by crimping the top annular section of the cathode container inwardly against the anode cup via a grommet of nylon as described in U.S. Pat. No. 3,069,489.

Each cell was made identically except that in one of the cells a gold layer was vacuum deposited on the top surface of the cathode facing the separator and extended over the side wall as shown in FIG. 1. The amount of gold employed was about 600 micrograms per square inch.

Figure 3:
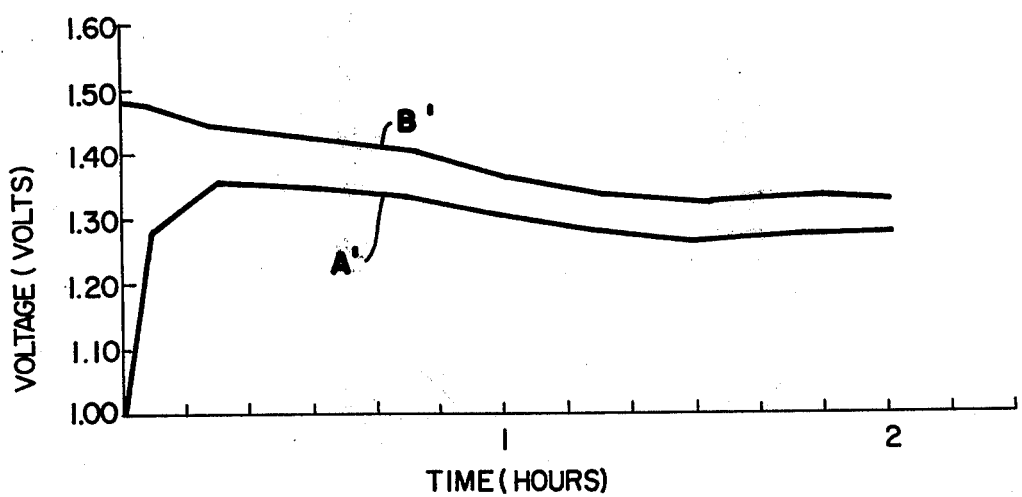
FIG. 3 shows curves of the discharge voltages of a silver oxide-zinc cell of the prior art.

Both of the cells were tested on a 20 milliampere drain for over 2 hours. The voltage data for the cell employing the gold layer in accordance with this invention (Cell A) are shown plotted as curve A in FIG. 2. The data of the corresponding discharge voltages for the cell not having the gold layer (Cell A') are shown plotted as curve A' in FIG. 3. Using the test procedure as disclosed in the Journal of Electrochemical Society, Vol. 107, No. 6 June 1960 and Vol. 119 No. 8 Aug. 1972, the resistance-free discharge voltage was observed for the cell with the gold layer and the cell without the gold layer and the data obtained were plotted as curves B and B' in FIGS. 2 and 3, respectively. As is apparent from FIGS. 2 and 3, the cell without the gold layer exhibited a higher internal resistance during initial discharge and took over fifteen minutes before the voltage exhibited the normal or expected voltage level. The normal or expected voltage level for cells of the type tested was found to be about 0.060 to 0.085 volt lower than the resistance-free discharge voltage. The cell employing a gold layer exhibited a substantially lower internal resistance than the cell without a gold layer and therefore was able to exhibit a discharge voltage curve substantially parallel to the resistance-free discharge voltage curve. Thus the cell containing the gold layer displayed the expected discharge voltage immediately on discharge.

To further confirm the above observations, the a.c. impedance of the cells was measured both before and after discharge at 40 and 1000 Hertz. The data observed are shown in Table 1 and confirm that the internal cell impedance is lower before discharge for a cell employing a gold layer as opposed to a cell not having a gold layer.

EXAMPLE 2

Two cells, identical to the miniature button cells of Example 1 had an additional amount of the electrolyte added as in Example 1 to insure that the voids of the cathode were effectively filled with the electrolyte. Each cell was discharged at 70° F. across a 140,000-ohm continuous load and for 1.25 seconds of every 10 minute period the cell was discharged across a 30-ohm load. This pulse discharge regime represents simulated operating conditions of battery-powered watches which require high current pulses for proper operation.

Figure 4:
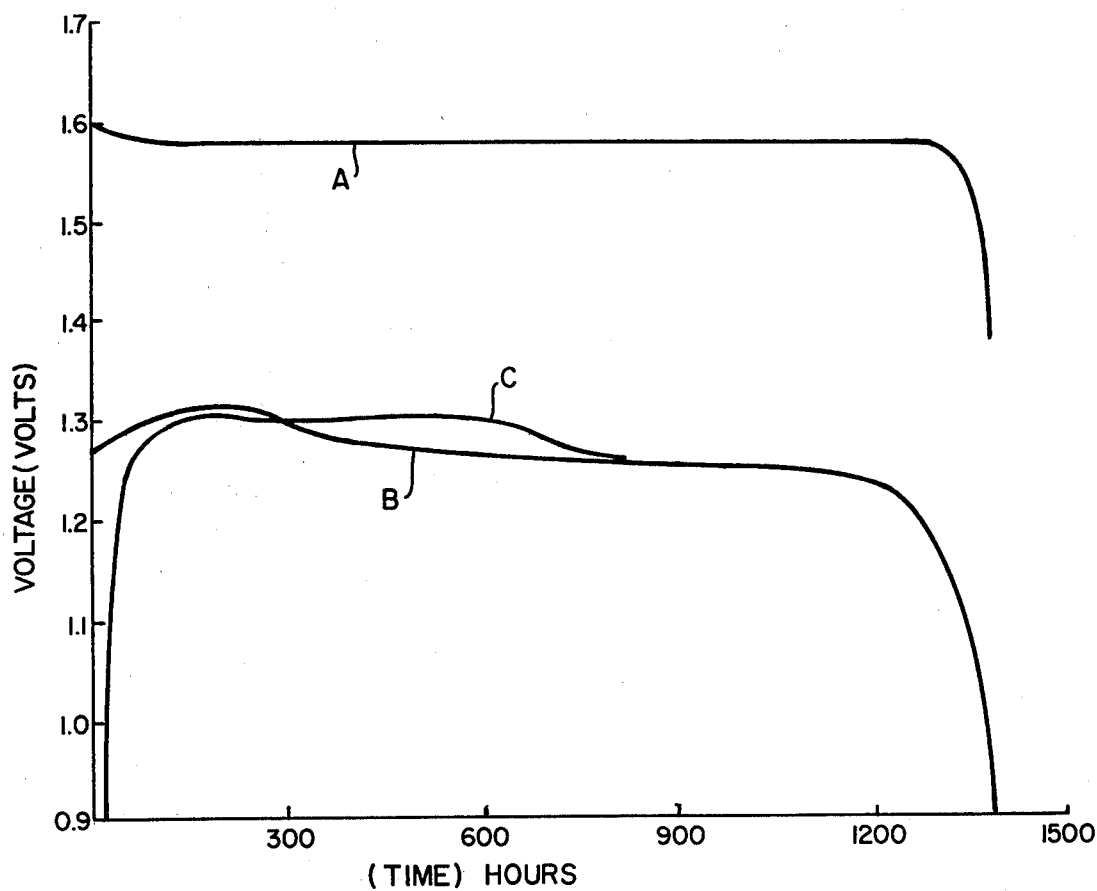
FIG. 4 shows curves comparing the discharge voltage of two miniature silver oxide-zinc cells, one cell employing a conductive layer in accordance with the teachings of this invention and the other cell made without such a conductive layer.

The discharge voltage data for both the cell without the gold layer and the cell with the gold layer on a 140,000-ohm continuous load were observed to be substantially the same and thus are shown as a single curve in FIG. 4 identified as curve A.

TABLE 1

| Cell Sample | Cell Impedance (ohms) | | | |
|---|---|---|---|---|
| | 40 Hertz | | 1000 Hertz | |
| | Before Discharge | After Discharge | Before Discharge | After Discharge |
| Cell A | 10.5 | 2.8 | 4.0 | 2.7 |

TABLE 1-continued

| Cell Sample | Cell Impedance (ohms) | | | |
|---|---|---|---|---|
| | 40 Hertz | | 1000 Hertz | |
| | Before Discharge | After Discharge | Before Discharge | After Discharge |
| Cell A' | 32.0 | 2.3 | 19.0 | 2.1 |

The data obtained from the pulsed 30-ohm load test were plotted as points on the graph of FIG. 4 and then the points were connected to yield curve B for the cell employing a gold layer and curve C for the cell without a gold layer. As is apparent from the curves in FIG. 4, the initial voltage discharge level for the cell without the gold layer (curve C) took over 100 hours before it reached the 1.2 volts level thus indicating that during this period it may not supply sufficient power to operate a battery-powered watch. Contrary to this, the cell employing a gold layer in accordance with this invention exhibited an initial discharge voltage level above 1.2 volts immediately upon discharge and continued to exhibit such a voltage level far in excess of 1200 hours. This comparison of curves B and C clearly demonstrates that using the teaching of this invention the internal resistance or impedance of a silver oxide-zinc cell can be greatly reduced during initial discharge so as to make it suitable for various battery-powered devices such as watches.

It is to be understood that other modifications and changes in the preferred embodiments of the invention herein shown and described can also be made without departing from the spirit and scope of the invention. In addition, this invention is admirably suited for use with silver oxide-zinc cells as disclosed in U.S. patent applications Ser. No. 482,996 and Ser. No. 483,014, identified above, to produce cells having a substantially unipotential discharge level on low drain conditions.

What is claimed is:

1. In a metal oxide alkaline cell comprising a negative electrode, a positive electrode housed in an electronically conductive container having a bottom and a side wall, a separator disposed between said negative electrode and said positive electrode, and an electrolyte, said positive electrode comprising a metal oxide wherein the improvement comprises a layer of electronically conductive material selected from the group consisting of gold, platinum, rhodium, palladium, lead, tungsten, tantalum, nickel, iron disulfide and lead oxide, said electronically conductive material being disposed solely at the interface of the separator and the positive electrode and extending sufficiently to contact the wall of the conductive container so as to decrease the internal resistance at the separator-cathode-cathode collector interfaces and thereby substantially eliminate the voltage variations usually associated with the initial discharge of metal oxide cells and said electronically conductive material being sufficiently porous so as not to effectively interface with the ionic flow between the negative and positive electrodes of the cel'

2. In the metal oxide alkaline cell of claim 1 wherein the electronically conductive material of said layer is present in an amount between about 130 micrograms per square inch and about 3000 micrograms per square inch based on the surface area of the positive electrode facing the separator.

3. In the metal oxide alkaline cell of claim 1 wherein the active cathode material of the positive electrode is selected from the group consisting of silver oxide, mercury oxide, copper oxide, cadmium oxide and mixtures thereof with manganese dioxide and vanadium pentoxide.

4. In the metal oxide alkaline cell of claim 1 wherein the positive electrode comprises divalent silver oxide and said electronically conductive material in the conductive layer is gold.

5. In the metal oxide alkaline cell of claim 1 wherein the electronically conductive layer is disposed across the entire area of the positive electrode surface facing the separator and wherein said conductive layer is a porous layer.

6. In the metal oxide alkaline cell of claim 1 wherein said conductive material is a nickel mesh.

7. In the metal oxide alkaline cell of claim 4 wherein the positive electrode is a mixture of monovalent silver oxide and at least 50% by weight of divalent silver oxide.

8. In the metal oxide alkaline cell of claim 2 wherein the gold is present in an amount between about 500 micrograms per square inch and about 2000 micrograms per square inch based on the surface area of the positive electrode facing the separator.

9. In the metal alkaline cell of claim 7 wherein the layer of gold is a porous layer disposed across the entire area of the positive electrode surface facing the separator and extends over the side wall of the positive electrode in contact with the wall of the conductive container.

10. In the metal oxide alkaline cell of claim 7 wherein the layer of gold is a porous layer disposed across the entire area of the positive electrode surface facing the separator and extends over the side wall of the separator in contact with the wall of the conductive container.

11. In the metal oxide alkaline cell of claim 7 wherein the positive electrode consists of 80% by weight divalent silver oxide with the remainder monovalent silver oxide.

12. In the metal oxide alkaline cell of claim 7 wherein said gold layer is a gold mesh.

13. In the metal oxide alkaline cell of claim 7 wherein the gold layer is a porous gold film.

* * * * *

UNITED STATES PATENT OFFICE
CERTIFICATE OF CORRECTION

Patent No. 4,015,055　　　　Dated March 29, 1977

Inventor(s) Richard Allen Langan et al.

It is certified that error appears in the above-identified patent and that said Letters Patent are hereby corrected as shown below:

Column 4, line 15, "slver" should read -- silver --.

Claim 8, first line, "2" should read -- 7 --.

Signed and Sealed this twenty-sixth Day of July 1977

[SEAL]

Attest:

RUTH C. MASON
Attesting Officer

C. MARSHALL DANN
Commissioner of Patents and Trademarks